United States Patent
Agarwal et al.

(10) Patent No.: US 12,095,769 B2
(45) Date of Patent: Sep. 17, 2024

(54) EXPEDITED AUTHORIZATION AND CONNECTIVITY OF CLIENT DEVICES

(71) Applicant: HEWLETT PACKARD ENTERPRISE DEVELOPMENT LP, Houston, TX (US)

(72) Inventors: Rahul Agarwal, Bangalore (IN); Vikram Limaye, North Sydney (AU)

(73) Assignee: Hewlett Packard Enterprise Development LP, Spring, TX (US)

( * ) Notice: Subject to any disclaimer, the term of this patent is extended or adjusted under 35 U.S.C. 154(b) by 463 days.

(21) Appl. No.: 17/507,735

(22) Filed: Oct. 21, 2021

(65) Prior Publication Data
US 2023/0129776 A1    Apr. 27, 2023

(51) Int. Cl.
*H04L 29/06* (2006.01)
*H04L 9/40* (2022.01)
(Continued)

(52) U.S. Cl.
CPC ........ *H04L 63/102* (2013.01); *H04L 12/4641* (2013.01); *H04L 47/82* (2013.01);
(Continued)

(58) Field of Classification Search
CPC ............... H04L 63/102; H04L 12/4641; H04L 47/82; H04L 63/0876; H04L 63/101; H04L 63/105; H04L 2463/062; H04L 63/0272
See application file for complete search history.

(56) References Cited

U.S. PATENT DOCUMENTS

| | | | |
|---|---|---|---|
| 2005/0148321 A1* | 7/2005 | Igarashi | H04L 63/102 455/411 |
| 2008/0189764 A1* | 8/2008 | Gronholm | H04L 12/4641 726/3 |
| 2017/0373936 A1* | 12/2017 | Hooda | H04L 41/0816 |

FOREIGN PATENT DOCUMENTS

WO    WO-2014142985 A1 *  9/2014   ......... H04L 63/0272

OTHER PUBLICATIONS

Aliyya Nur Ramdhania, M. Teguh Kurniawan, Umar Yunan K. S. Hediyanto; "Network Infrastructure Design in Connectivity Using InterVLAN Concept in Bandung District Government"; Proceedings of the 3rd International Conference on Telecommunications and Communication Engineering; Nov. 2019; pp. 111-115 (Year: 2019).*

(Continued)

*Primary Examiner* — Fatoumata Traore
*Assistant Examiner* — Courtney D Fields
(74) *Attorney, Agent, or Firm* — Sheppard Mullin Richter & Hampton LLP

(57) ABSTRACT

Systems and methods are provided for authentication and authorizing a client device on a network. First, one or more packets are received from a computing entity indicating an authentication request from a client device requesting connection at a network. Next, identification information of the client device are extracted from a body of the packets. Credentials of the client device are verified based on the identification information. In response to verifying the credentials, a level of access of the client device at the network is determined. Based on the level of access, a VLAN is assigned to the client device. The systems concurrently transmit, in a single packet, to the computing entity, an indication of approval of the credentials and the assigned VLAN, wherein the computing entity provisions the (Continued)

assigned VLAN to the client device following an allocation of an IP address corresponding to the assigned VLAN to the client device.

20 Claims, 7 Drawing Sheets

(51) Int. Cl.
  *H04L 12/46* (2006.01)
  *H04L 47/70* (2022.01)
  *G06F 15/16* (2006.01)
  *H04L 12/08* (2006.01)
(52) U.S. Cl.
  CPC ........ *H04L 63/0876* (2013.01); *H04L 63/101* (2013.01); *H04L 63/105* (2013.01)

(56) References Cited

OTHER PUBLICATIONS

Cisco Systems, Inc., "Cisco ISE Endpoint Profiling Policies," Cisco ISE Profiling Service, Release 2.0, Aug. 18, 2020, 58 pages.
Mellor, D., "Evolving ClearPass Deployments," EMEA Atmosphere '17, May 31, 2017, 57 pages.

* cited by examiner

EXPEDITED AUTHORIZATION AND CONNECTIVITY OF CLIENT DEVICES

BACKGROUND

Data creation and consumption have been skyrocketing. In particular, annual data creation increased from 1.2 zettabytes (trillion gigabytes) to an estimated 60 zettabytes from 2010 to 2020. An estimated 22.2 billion client devices will access wireless local area networks (WLANs) in 2021, a number that has been increasing by over 20% every year since 2016. Meanwhile, 13.8 billion Internet of Things (IoT) devices worldwide are expected to be installed in 2021, and 30.9 billion IoT devices by 2025. In addition to wireless connections, an estimated 1.18 billion wired broadband connections further contributed to the ever-expanding environment of data. Data is expected to proliferate at ever increasing rates due in part to the rise of remote work and remote applications. In 2025, an estimated 180 zettabytes of data is projected to be created. With the burgeoning of data creation and access, data security and protection measures have concurrently been established in an effort to prevent or mitigate unauthorized access to information.

One particular measure that controls data access is authenticating a client device when that client device connects to a network device. Once authenticated, the client device has authorization to access and/or write to a subset (e.g., a portion or all of) the data associated with the network device. A change of authorization (CoA) protocol further provides a mechanism to change authorization of a client device nearly immediately. For example, a CoA may be used in scenarios of a change in a network device, such as an access control policy update, a risk or posture assessment policy update, and/or compliance updates such as new software, firmware, or firewall requirements resulting in a client device being noncompliant. Yet other scenarios include an update or decision by an administrator, which may also be implemented to change access for a client device via the CoA protocol.

BRIEF DESCRIPTION OF THE DRAWINGS

The present disclosure, in accordance with one or more various examples, is described in detail with reference to the following figures. The figures are provided for purposes of illustration only and merely depict typical or example examples.

FIG. 1 may be applicable to FIG. 2A.

FIGS. 1 and 2A may be applicable to FIG. 2B.

Figure 1:
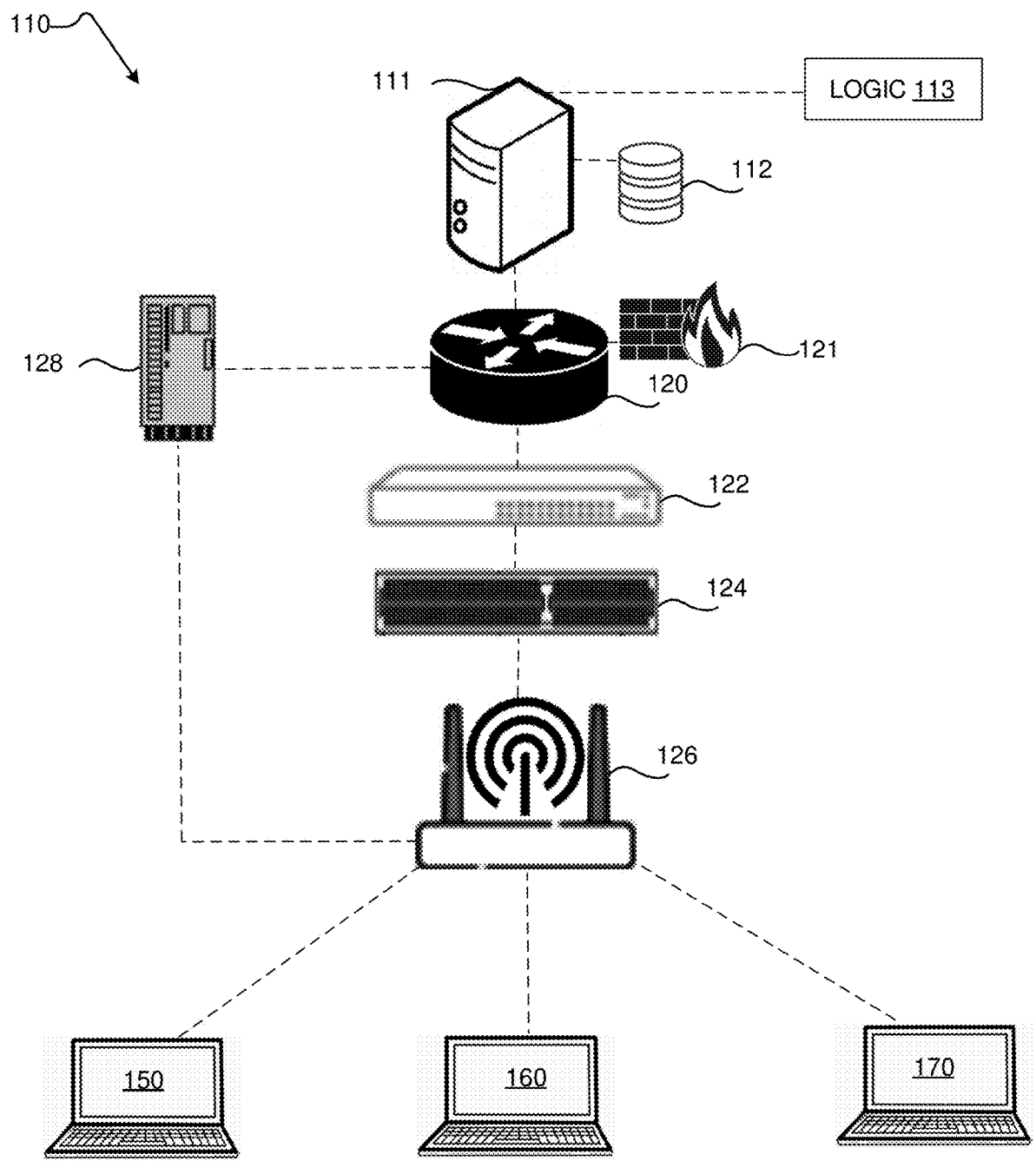
FIG. 1 is an exemplary illustration of a computing system that authenticates and authorizes client devices to access a network in a streamlined manner, according to examples described in the present disclosure.

The figures are not exhaustive and do not limit the present disclosure to the precise form disclosed.

DETAILED DESCRIPTION

When a client device seeks access to a network, the client device transmits one or more authentication packets or access request packets to an authentication server. Such packets may include a MAC authentication or a Dynamic Host Configuration Protocol (DHCP) discover packet. The authentication server verifies the information in the authentication packets, including credentials and transmit a message indicating that authentication is successful. The authentication server may then derive and/or recognize attributes of the client device such as a hardware device type, and determine an access control level or access level, and/or access privileges of the client device. The determination of the access privileges may be based on the hardware device type. The access privileges may be embodied in and/or correspond to a particular virtual local area network (VLAN) to be assigned to the client device. At the time of verifying credentials, the authentication server may not have been able to determine the appropriate access privileges for the client device. However, the authentication server may, at a same time as or immediately following verification of the credentials, determine initial access privileges for the client device to avoid disruptions or delays of connectivity or service. In some examples, the initial access privileges may be, or correspond to, default access privileges that are granted to each client device or a subset of client devices following initial verification of credentials. In some examples, the initial access privileges may include access to all resources in a network without restrictions. The client device may undergo the DHCP request to receive an internet protocol (IP) address. The IP address may be received from a different server from the authentication server, such as a DHCP server.

The authentication server may proceed to determine or derive final access privileges of the client device, which may be different from the initial access privileges. If the final access privileges are different. the authentication server may transmit a change of authorization (CoA) message or request to the client device or an associated access point to terminate or disconnect its current session in which the client device was granted initial access privileges. Such a process is manifested as a deauthentication for a client connected wirelessly and a port bounce for a client connected in a wired manner. This CoA message requests the client device to reinitiate the DHCP process to obtain a new IP address to initiate a new session, in which the client device is granted its final access privileges.

However, the inclusion of a CoA protocol may trigger complications and problems that potentially result in a client device not having access to a network or accessing a network with incorrect or undesired access privileges. First, the CoA protocol requires a port in order to receive the CoA request. The installation of such a port, which may be User Datagram Protocol (UDP) 3799, entails a change in policies of a firewall associated with the network, which may compromise security of the firewall. Next, the transmission of the CoA request from the authentication server may traverse multiple entities, including intermediary devices in a Level 2 (L2)/Level 3 (L3) network between a controller of an access point and the authentication server. These devices may include other network devices such as switches and router. However, if the intermediary devices fail to process or transmit the CoA request, the client device may not receive the CoA request. As a result, the client device may retain its initial access privileges, thereby potentially comprising data security otherwise afforded or provided by the firewall. Furthermore, even if the client device receives the CoA request and terminates its current session, the client device may nonetheless fail to renew or refresh the IP address within a certain time frame or during a lease expiration period, or fail to move to a different VLAN corresponding to the final access privileges. In some examples, the client device may attempt to exchange data using the original IP address following the CoA and receive a negative acknowledgement (NAK) from the authentication server because the client device failed to renew the original IP address. The NAK may indicate that the client device is unauthorized to keep the original IP address. In such examples, the client device may be unable to exchange data. Moreover, if the sequentially scheduled steps in the CoA protocol may occur out of order, resulting in the client device still retaining the initial access privileges.

The detrimental impacts of the CoA protocol may also be manifested in the DHCP server having to store and reserve additional IP addresses, which include the initial IP address corresponding to the initial access privileges and the updated IP address corresponding to the final access privileges. As mentioned above, the client device may occasionally fail to renew the original IP address and retain the original IP address, thus preventing the original IP address from being used in other processes. Furthermore, even if the client device renews the original IP address, the DHCP server may not be notified regarding such, and the original IP address may still be reserved for an unused process. Although setting a shorter lease time on each IP address may mitigate the issue of reserving unused IP addresses, such may not be feasible in some processes which require IP addresses to be reserved for a long duration.

Examples described herein address these challenges by implementing a computing component, such as a server, that authenticates client devices and provides access to a network commensurate with desired access privileges or a desired access level, without a CoA procedure. By foregoing the CoA procedure, the aforementioned detrimental impacts may be mitigated or obviated, thus streamlining the authentication procedure both from a client perspective and a perspective of other computing entities within the network, such as servers including the authentication server and the DHCP server. In particular, the UDP 3799 may not be installed on the firewall. Additionally, CoA messages would not be stuck within intermediary devices. The client device would bypass the requirement of renewing an IP address and switching VLANs, thereby avoiding downtimes in connectivity and service. The DHCP server would also conserve IP addresses because only a single IP address needs to be reserved for the client device instead of two different IP addresses, an initial IP address and a final IP address.

FIG. 1 is an example illustration of computing system 110 including one or more computing components that may encompass any of an authentication server 111, a router 120, a switch 122, a controller 124, an access point 126, and a DHCP server 128. In some examples, the router 120 may be associated with a firewall 121. The authentication server 111 may include a Remote Authentication Dial-In User Service (RADIUS) server in some examples. The authentication server 111 may further include or be associated with a database or cache 112 (hereinafter "database") which stores attributes of particular client devices and access control lists or policies associated with client devices, such as client devices 150, 160, and 170, which connect to a network via the access point 126. In some examples, the controller 124 may include a wireless local area network (WLAN) controller or an access point that manages a WLAN network, which may be applicable in relatively small WLAN networks. Although only three client devices are illustrated in FIG. 1, any number of client devices may be connected via the access point 126.

The database 112 may be integrated or embedded within the authentication server 111 or spatially separated from the authentication server 111. The access control lists may be stored as files and/or may be indexed. In some examples, the access control lists or policies may include particular access levels and/or access privileges to be assigned to each client device depending on a group or classification that the client device belongs to. For example, the access privileges may indicate a subset (e.g., a portion or all) of data resources, such as particular data servers, databases, platforms, objects, file directories, or files that each client device is authorized to access, particular protocols (e.g., Hypertext Transfer Protocol (HTTP) or File Transfer Protocol (FTP)) that each client device may utilize to access data resources, a transmission speed or rate to be provided to each of the client devices, one or more Vendor Specific Attributes (VSA), and/or a particular VLAN to be assigned to each client device. In some examples, the VSA may include bandwidth on incoming and/or outgoing traffic, and download and/or upload speeds. The access control lists or policies may be stored in the database 112 of the authentication server 111, rather than at other computing components such as the router 120, so that the authentication server 111 may centrally update the access control lists or policies and propagate any updates to any routers in the network. In contrast, if the router 120 stored the access control lists or policies, any updates at the router 120 may not be propagated to other routers in the network.

Each of the computing components may include one or more hardware processors and logic that implements instructions to carry out the functions of the computing components. In particular, the authentication server 111 may include or be associated with logic 113. The logic 113 may receive one or more authentication packets transmitted by a client device via the controller 124. The logic 113 may verify credentials of the client device. The logic 113 may then decipher or extract one or more attributes from the authentication packets, including a media access control (MAC) address of the client device, one or more hardware attributes such as a type of client device (e.g., tablet, desktop computer, IoT device), and/or one or more software attributes of the client device. The logic 113 may record an entry in the database 112 regarding the attributes. The logic 113 may then determine or derive, using the attributes, a particular access level or privilege, a VLAN corresponding to or commensurate with the particular access level or privilege, and/or a VSA for the client device. If the attributes fail to map to a particular VLAN, the logic 113 may determine that either no access, a default access level and/or minimum access privileges are to be granted to the client device.

The logic 113 may transmit, to the controller 124, an authentication response, indicating that the authentication of the client device was successful and the particular access level or privilege, the VLAN and/or VSA authorized for the client device. Thus, the logic 113 may wait until determining the particular access level or privilege, the VLAN, and/or the VSA before sending the authentication response, in a single packet, to the client device. In some alternative examples, the logic 113 may transmit, to another computing component such as the controller 124, an access control list in which the client device is grouped or categorized. The controller 124 may determine particular access privileges, VLAN, and/or Quality of Service (QoS) parameters. The controller 124 may assign the VLAN to the client device, and provision data resources to the client device within the network according to the access privileges and the QoS parameters.

Using such a workflow, the logic 113 may eliminate a CoA, thereby conferring a technical benefit both to client devices and to a network, including the network devices such as the computing components. In particular, the client devices no longer need to perform VLAN switching or requesting and obtaining a new IP address which would have been required in a scenario of a CoA. The client devices also receive their final VLAN assignment and IP address in a more expedited fashion. Additionally, the network firewall may be maintained without changes, such as the UDP 3799 installation, while conserving IP addresses by the DHCP server. Moreover, the elimination of the CoA process further improves synchronization of operations at the authentication server 111 because the authentication server 111 may no longer need to adjust timers that control timing of processes due to delays associated with the CoA, such as delays of transmitting the CoA through the intermediary devices and processing the CoA at the client device. Additionally, the authentication server 111 may no longer require additional time prior to deletion of attributes of a current authentication session from the database 112.

Figure 2A:
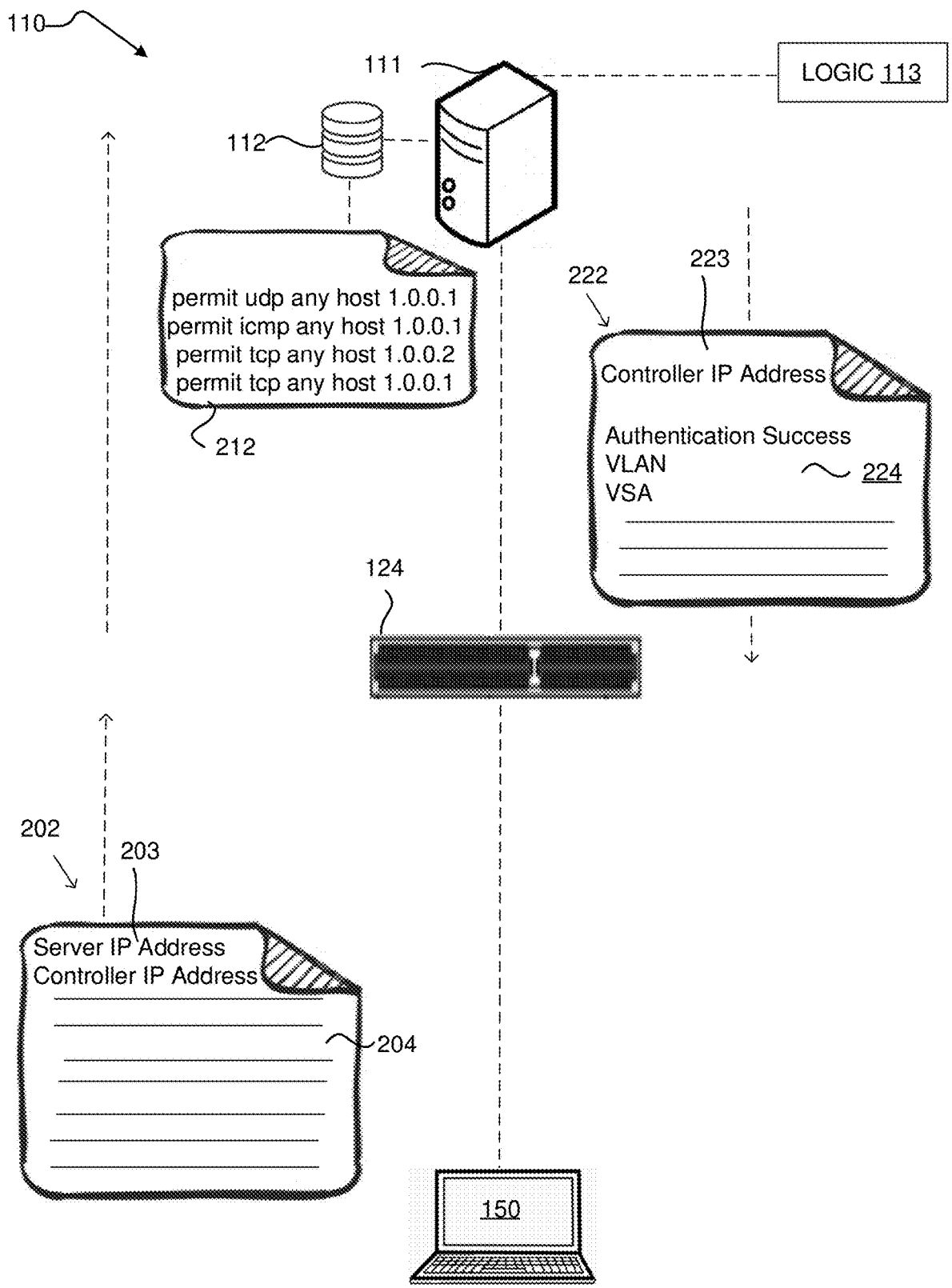
FIG. 2A is an exemplary illustration that explains how a computing system receives an authentication request, determines access levels, access privileges, and/or other parameters regarding access to the network by client devices, and determines assignments of VLANs to the respective client devices, according to examples described in the present disclosure.

FIG. 2A explains a role of the authentication server 111 illustrated in FIG. 1. The authentication server 111 receives one or more authentication packets 202 from the controller 124. The authentication packets 202 may have been originally transmitted by the client device 150 to the controller 124. The authentication packets 202 may include a header 203 and a body 204. The header 203 may include, among other information, an IP address of one or more destinations, including the authentication server 111 and/or the controller 124. The body 204 may include information pertaining to authentication and authorization of the client device 150, such as a MAC address of the client device 150, a hardware type or version of the client device 150, and/or software functions or capabilities of the client device 150. The authentication server 111 may encrypt password information of the client device 150 within the body 204, but may leave all other information unencrypted.

Once the authentication server 111 receives the authentication packets 202, the authentication server 111 may first verify credentials from the body 204, and extract or derive attributes from the authentication packets to determine a type of the client device 150 in order to determine an access level or access privileges authorized for the client device 150, including a VLAN and VSA to be assigned to the client device 150. The authentication server 111 may refrain from, avoid, or hold off from sending a packet indicating authentication success to the controller 124 or to the client device 150 until completing the determination of the access level or access privileges. In such a manner, a single response packet, rather than numerous response packets, may be transmitted to the controller 124 following determination of the access level or access privileges. Additionally, the authentication server 111 may forego any CoA message during the determination of the access level or access privileges.

In some examples, the derivation of attributes may be from a MAC address of the client device 150. The authentication server 111 may extract the MAC address from a single authentication packet. In some examples, the authentication server 111 may determine the type of the client device 150 from the MAC address alone, using a single authentication packet. If the authentication server 111 cannot extract sufficient information regarding the attributes of the client device 150 from only a single authentication packet, the authentication server 111 may extract information from one or more additional packets. In other examples, the authentication server 111 may determine the type of the client device 150 from the MAC address in conjunction with other information within the body 204 such as an Organizationally Unique Identifier (OUI), or from other information within the body 204. The authentication server 111 may determine or derive an access level or access privileges of the client device 150 using the attributes based on policies or lists stored in the database 112. For example, the lists may include access control lists. The authentication server 111 may retrieve any access control lists relevant to the client device 150, such as lists that satisfy some or all of the attributes of the client device 150. If no access control lists satisfy all of the attributes of the client device 150, the authentication server 111 may determine that the client device 150 is unauthorized to access the network, or, may authorize the network at a default level.

The access control lists may have a syntax of: "[permit|deny]<protocol> <source IP address> <source mask> <destination IP address> <destination mask> <options>." Thus, the access control lists may begin with either a permit or a deny, indicating whether to permit or deny a particular protocol to a source when accessing a particular destination. The protocol may indicate an access privilege. The source may be indicated by an IP address of the source. The destination may be indicated by an IP address of the destination. Both the source mask and the destination mask may include a wildcard mask or a subnet mask. A wildcard mask may identify an individual or a group or range of IP addresses to permit or deny access. An example access control list 212 illustrates that on destination 1.0.0.1, a User Datagram Protocol (UDP), Internet Control Message Protocol (ICMP), and Transmission Control Protocol (TCP) protocol are permitted for communication by any host, or client device, and on destination 1.0.0.2, a TCP protocol is permitted for communication by any host. Because the example access control list 212 applies for any client device, the client device 150 would be permitted to communicate on destination 1.0.0.1 using UDP, ICMP, and TCP, and on destination 1.0.0.2 using TCP.

From applicable access control lists, the authentication server 111 may determine or derive access levels or privileges and VSA. For example, the authentication server 111 may determine that the client device 150 may be authorized to access a subset (e.g., any or all) of data resources including particular databases, servers, or platforms, communicate using particular protocols, such as any of UDP, ICMP, and TCP, a bandwidth on incoming and/or outgoing traffic, and download and/or upload speeds (e.g., 100 MBps) allocated to the client device 150. The authentication server 111 may transmit, to the controller 124, a response packet 222 that includes a header 223 and a body 224. The header 223 may include an IP address of a destination, which may be the controller 124. The body 224 may include an indication of authentication success, a particular VLAN to be assigned to the client device 150, and/or access control levels, privileges, and VSA. Therefore, the authentication server 111 may send a single packet that combines an authentication success message with a particular VLAN that the client device 150 is authorized for, rather than multiple packets in the scenario of using a CoA. In a same or similar manner, if the client devices 160 and/or 170 in FIG. 1 also transmit authentication packets, the authentication server 111 may determine a VLAN commensurate with their access levels, access privileges, and/or VSA.

As an illustrative example, the authentication server 111 may determine that the client device 150 is authorized to receive access to a first subset of data resources including internet only, and is to be assigned to a first VLAN. The authentication server 111 may determine that the client device 160 is authorized to receive access to a second subset of data resources including internet and a portion of the data resources within the network, and is to be assigned to a second LAN. The authentication server 111 may determine that the client device 170 is authorized to receive access to a third subset of data resources including internet and all of the data resources within the network, and is to be assigned to a third LAN, while being provided particular bandwidths on incoming and outgoing traffic. Thus, in such a manner, the authentication server 111 may assign different VLANs to different client devices depending on their respective access levels or access privileges, and/or VSA.

By foregoing the CoA, the authentication server 111 may streamline an authentication and authorization process for the client device 150 without disrupting the firewall 121. Additionally, the absence of the CoA mitigates or eliminates a risk of the client device 150 either accessing unauthorized data resources or being unable to connect to authorized data resources due to inability to receive or process the CoA.

In some examples, the authentication server 111 may also generate an IP address corresponding to the VLAN. In other examples, the authentication server 111 may not generate an IP address. Instead, the DHCP server 128 may instead generate the IP address. In yet other examples, as an alternative to the aforementioned determination or derivation of the particular VLAN by the authentication server 111, the authentication server 111 may not determine or derive the particular VLAN to be assigned to the client device 150, and/or access levels, privileges, and VSA itself. Instead, the authentication server 111 may either inform a different computing entity, such as the controller 124, regarding the relevant access control lists to derive attributes of the client device 150, or propagate the relevant access control lists to a different computing entity.

In some examples, if the access control lists, or a subset thereof, are currently being modified, the authentication server 111 may delay the determination of the assignment of the VLAN based on an estimated duration of the modification, a likelihood and/or an extent of the modification affecting access to particular data resources for the client device 150, and/or a relative importance, in terms of security and/or privacy, of data resources or protocols pertaining to the modification and to the client device 150. The estimated duration may encompass an estimated time for the modification to be completed and persisted into the database 112. Such a relative importance may be manifested by classifications, constraints, and/or markings of the data resources. For example, if the data resources pertaining to the modification are classified as beyond a threshold classification, such as "secret" or "top secret," then the authentication server 111 may delay the determination of the VLAN, or, if the expected duration of the modification exceeds a threshold duration, the authentication server 111 may assign a VLAN that does not grant access to those data resources or protocols pertaining to the modification.

In such a manner, if the expected duration of the modification would likely cause an excessive delay to the client device 150, then the authentication server 111 may provide access to some resources without risking security or privacy of the data resources referenced or encompassed by the access control lists that are being modified. Additionally, the authentication server 111 may avoid potentially having to assign a new VLAN, which would entail a CoA, following the modification to the access control lists.

Figure 2B:
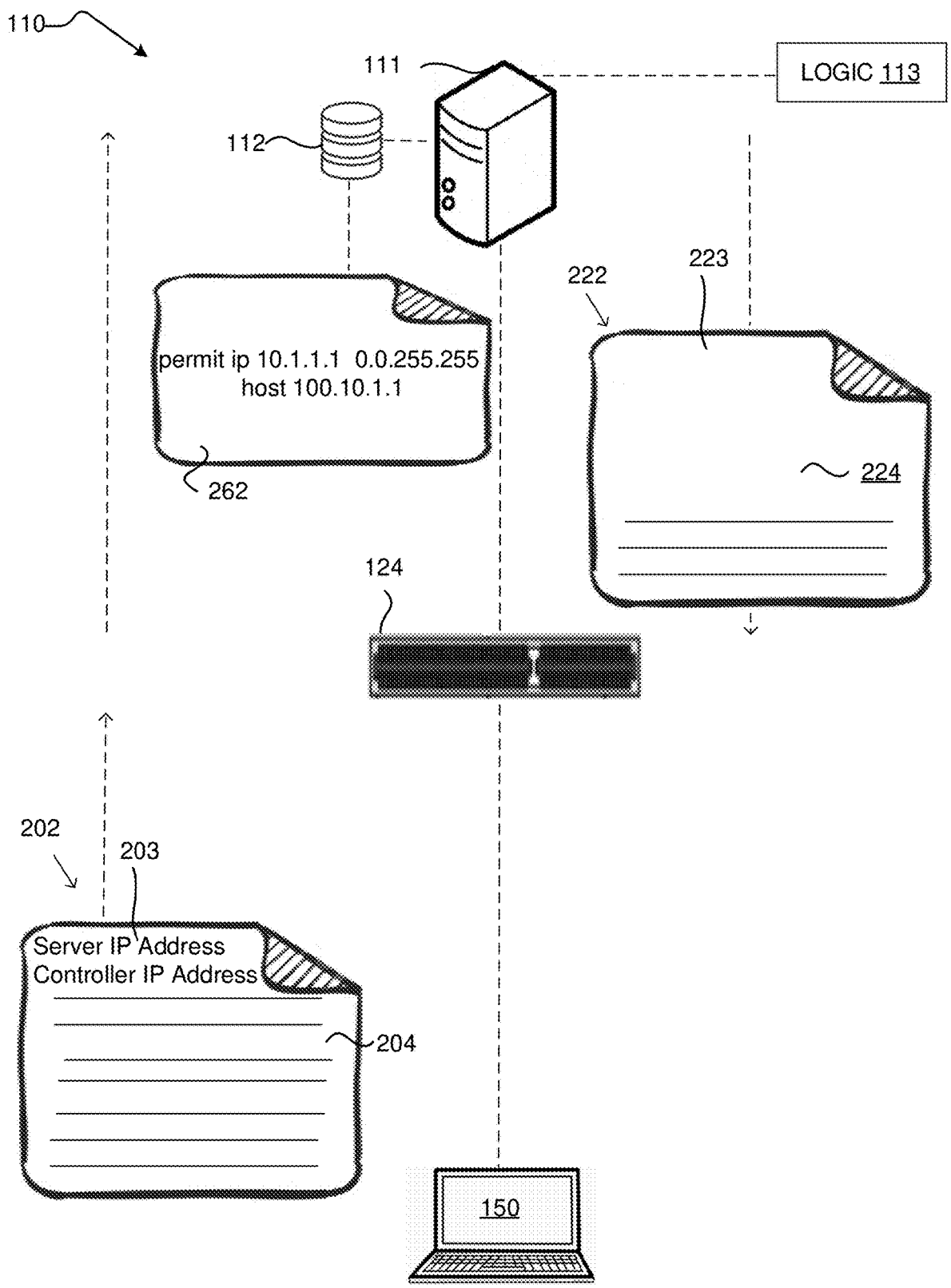
FIG. 2B is an exemplary illustration that explains how a computing system utilizes or leverages access control lists to determine access levels, access privileges, and/or other parameters regarding access to the network by client devices, and determines assignments of VLANs to the respective client devices, according to examples described in the present disclosure.

As illustrated in FIG. 2B, if an access control list 262 is being modified, the authentication server 111 may determine whether or not to delay the determination of the assignment of the VLAN to the client device based on an estimated duration of the modification, a likelihood and/or an extent of the modification affecting access to particular data resources for the client device 150, and/or a relative importance, in terms of security and/or privacy, of data resources or protocols pertaining to the modification and to the client device 150.

The access control list 262 may indicate that any client device having an IP address of a format 10.1.x.y is permitted to access a host within the network having an IP address of 100.10.1.1, in which x and y may be any octets. In the access control list 262, the "0.0.255.255" may be a wildcard mask indicating that the first two octets "10.1" are required to be exact matches while the last two octets need not be exact matches. Thus, if the client device 150 has an IP address of a format 10.1.x.y, then the modification to the access control list 262 may impact the access level or access privileges of the client device 150, which may impact a VLAN to be assigned to the client device 150. The authentication server 111 may determine whether to delay assignment of the VLAN based on a security level, marking, or constraint of the host 100.10.1.1, an expected duration or remaining duration of the modification to the access control list 262, and/or a predicted importance or frequency of access of the host 100.10.1.1 by the client device 150. For example, if the host 100.10.1.1 is likely to be accessed frequently, at a greater than threshold frequency, and has a security level that exceeds a threshold level such as "secret" or "top secret," the authentication server 111 may delay the assignment of the VLAN.

An alternative of providing the client device 150 access to a portion of resources that excludes the host 100.10.1.1 may be less viable because of the relative importance of the host 100.10.1.1 to the client device 150. Otherwise, if the host 100.10.1.1 were unlikely to be accessed frequently, at an expected frequency of less than a threshold frequency, the authentication server 111 may provide the client device 150 access to a portion of resources that excludes the host 100.10.1.1.

Figure 3:
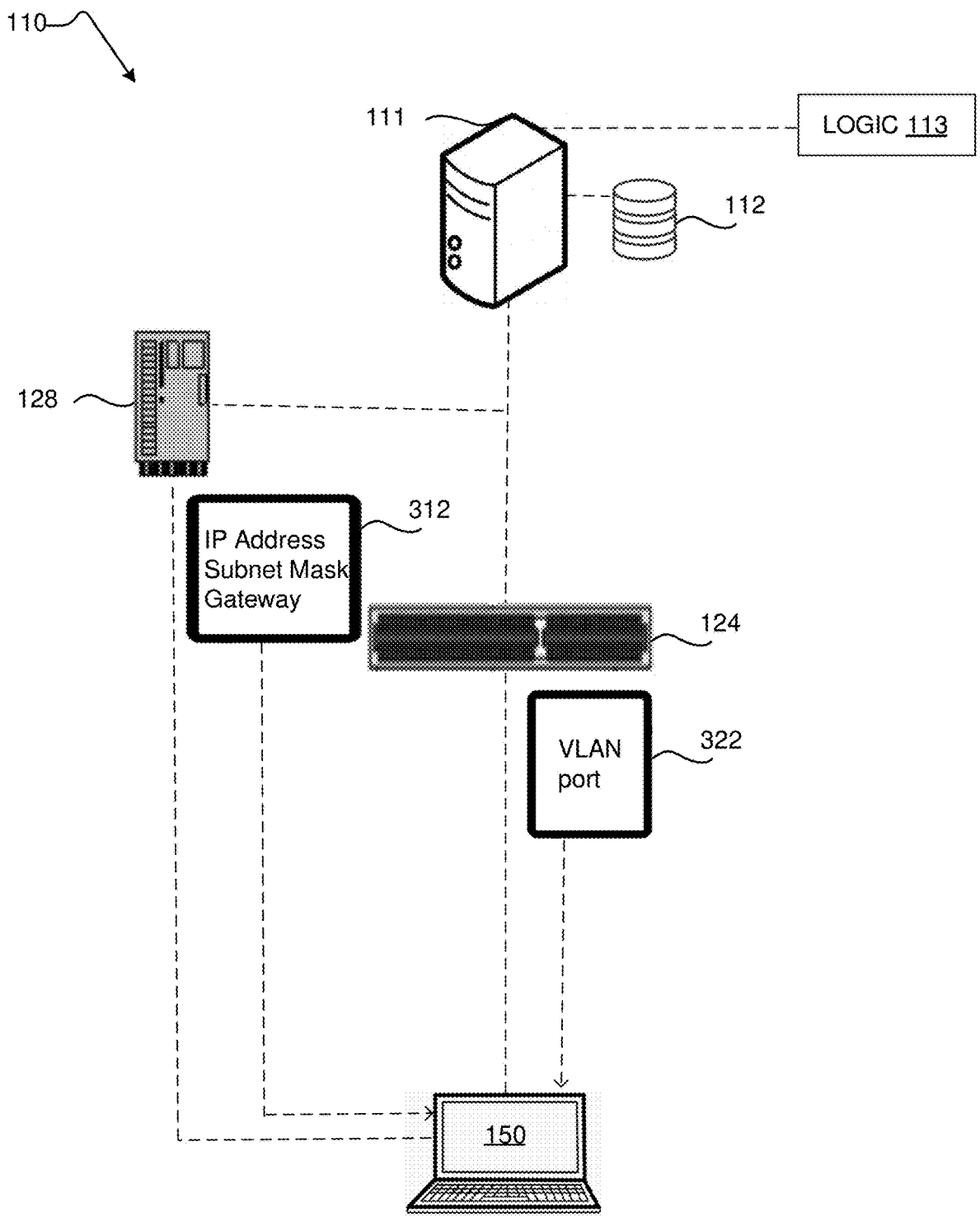
FIG. 3 is an exemplary illustration that explains how a client device is provided access to a network via an assigned VLAN, following a procedure illustrated in FIG. 2A, according to examples described in the present disclosure.

FIG. 3 explains some of the roles of the controller 124 and the DHCP server. As alluded to in FIG. 2A, the controller 124 may receive the response packet 222 from the authentication server 111. The controller 124 may obtain the VLAN assignment for the client device 150 from the response packet 222 or derive the VLAN assignment itself. The controller 124 may then assign the corresponding VLAN and a particular port to the client device 150. Because the client device 150 need not undergo a CoA, the client device 150 may avoid different or changing VLAN assignments during the initial authorization stage, thereby obviating the need to change VLANs. The client device 150 may, following the receipt of the assignment, request an IP address, subnet mask, and/or gateway from the DHCP server 128. The DHCP server 128 may generate and/or allocate such an IP address 312, including a subnet mask and/or gateway, and transmit the IP address 312 to the client device 150. Because the client device 150 only requests an IP address once, without renewing during the initial authorization stage, the DHCP server 128 may only allocate a single IP address for the client device 150, instead of multiple IP addresses which would be unusable by other client devices. Thus, by eliminating a CoA, the client device 150 and other computing entities, such as the DHCP server 128, may both conserve computing resources while the client device 150 connects relatively seamlessly to a network. By presenting the IP address 312, the client device 150 may receive access to authorized resources according to the assignment 322.

Figure 4A:
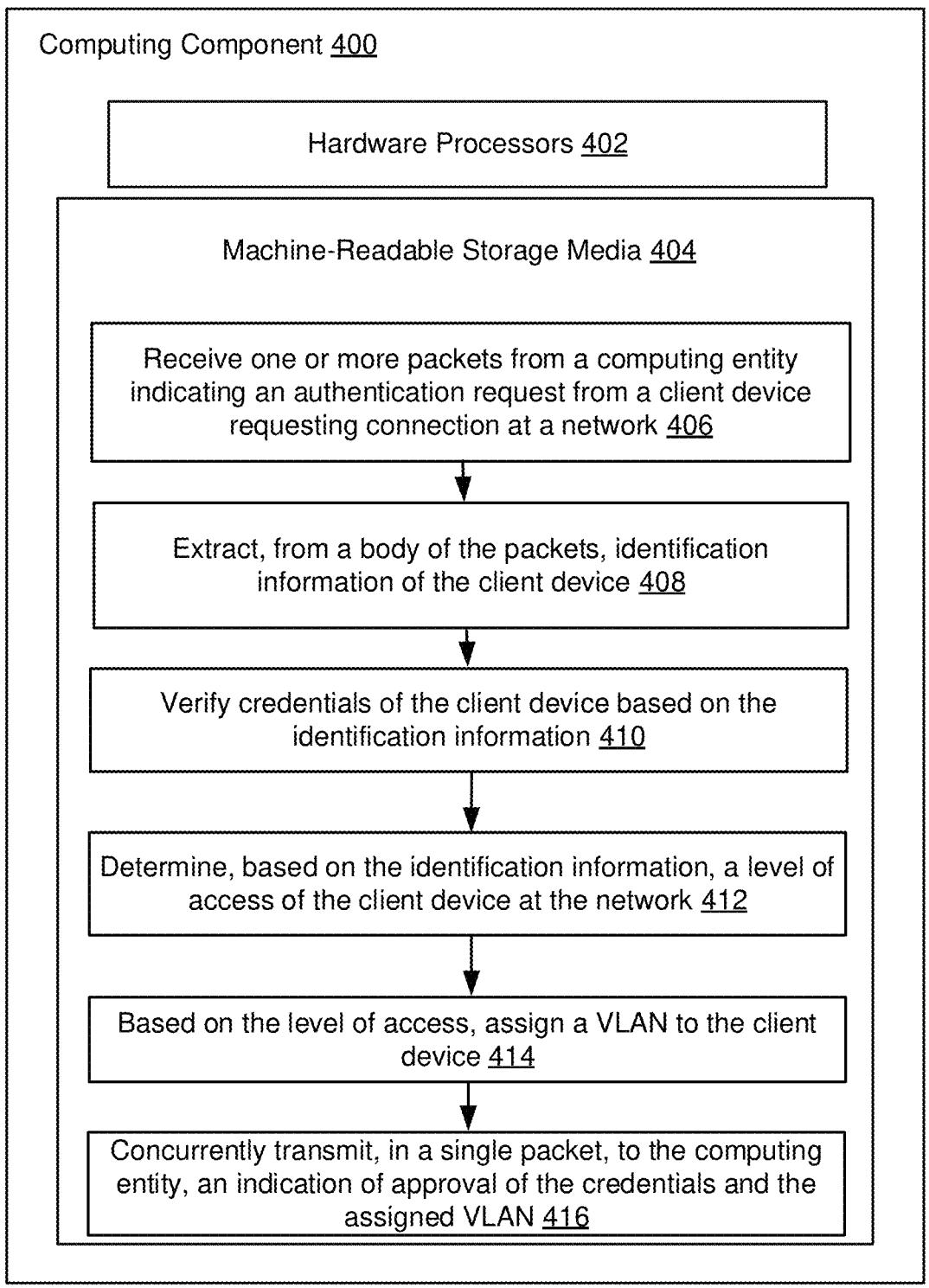
FIG. 4A is an exemplary flowchart, depicting an exemplary illustration of a computing component that authenticates and authorizes client devices to access a network, and determines assignments of VLANs to the client devices, according to examples described in the present disclosure.

FIG. 4A illustrates a computing component 400 that includes one or more hardware processors 402 and machine-readable storage media 404 storing a set of machine-readable/machine-executable instructions that, when executed, cause the hardware processor(s) 402 to perform an illustrative method of reducing computing costs while maintaining network services and performance. It should be appreciated that there can be additional, fewer, or alternative steps performed in similar or alternative orders, or in parallel, within the scope of the various examples discussed herein unless otherwise stated. The computing component 400 may be implemented as the authentication server 111 of FIGS. 1, 2, and 3. The machine-readable storage media 404 may include suitable machine-readable storage media described in FIG. 5. FIG. 4A summarizes and elaborates on some aspects previously described.

At step 406, the hardware processor(s) 402 may execute machine-readable/machine-executable instructions stored in the machine-readable storage media 404 to receive one or more authentication packets (e.g., authentication packets 202) indicating an authentication request from a client device (e.g., the client device 150) requesting connection at a network. As alluded to with regard to FIG. 2A, the hardware processor(s) 402 may receive the authentication packets from a computing entity such as the controller 124. The authentication packets may include a header (e.g., the header 203) indicating one or more IP addresses corresponding to destinations of the authentication packets. These destinations may include the controller 124 and the authentication server 111. The authentication packets may further include a body (e.g., the body 204) indicating attributes of the client device 150 such as a MAC address or an OUI.

At step 408, the hardware processor(s) 402 may execute machine-readable/machine-executable instructions stored in the machine-readable storage media 404 to extract, from the body of the packets, identification information of the client device. At step 410, the hardware processor(s) 402 may execute machine-readable/machine-executable instructions stored in the machine-readable storage media 404 to verify credentials of the client device based on the identification information. If the hardware processor(s) 402 determine to authenticate the client device, the hardware processor(s) 402 may refrain from or avoid transmitting an authentication approval message to the client device 150 or to the computing entity, until completing determination of a level of access or access privileges of the client device and assignment of a VLAN. In such a manner, the hardware processor(s) 402 may not grant permission to the network for the client device immediately following authentication, to avoid a CoA. By avoiding the CoA, the hardware processor(s) 402 not only streamline an authorization process for the client device but also benefit other computing components within the network. In particular, avoiding the CoA may prevent installation of a port on a firewall associated with an intermediary device to accommodate the CoA, while mitigating or eliminating a possibility that the client device could access unauthorized resources or be unable to access authorized resources in the network due to failure of CoA transmission or processing. Additionally, only a single IP address needs to be reserved for the client device by a DHCP server, rather than multiple IP addresses.

At step 412, the hardware processor(s) 402 may execute machine-readable/machine-executable instructions stored in the machine-readable storage media 404 to determine a level of access, access privileges, and/or VSA of the client device at the network, following the verification of the credentials. The determination of the level of access, access privileges, and/or the VSA may be based on access control lists, as illustrated in FIG. 2A. For example, the access control lists may include general access privileges, as illustrated by the access control list 212 in FIG. 2A, or more specific access control lists that only pertain to particular types of client devices or particular client devices of certain IP addresses. The hardware processor(s) 402 may determine which access control lists pertain to the client device based on a comparison between the extracted attributes of the client device to the indicated types of client devices or particular client devices within the access control lists. The access control lists may specify whether or not particular client devices are permitted or denied access to certain protocols or certain resources. In some examples, the VSA may include, a bandwidth on incoming traffic allocated to the client device, a bandwidth on outgoing traffic, a download speed, and/or an upload speed allocated to the client device.

At step 414, the hardware processor(s) 402 may execute machine-readable/machine-executable instructions stored in the machine-readable storage media 404 to assign a VLAN to the client device that is commensurate with or corresponding to the level of access, access privileges, and/or the VSA determined from the previous step 412. At step 416, the hardware processor(s) 402 may execute machine-readable/machine-executable instructions stored in the machine-readable storage media 404 to transmit concurrently, in a single packet, to the computing entity, an indication of approval of the credentials and the assigned VLAN. In addition, the hardware processor(s) 402 may transmit, in the single packet, an indication of the VSA. Upon the computing entity receiving the single packet, the computing entity may assign the VLAN to the client device. The client device may request, from a DHCP server, an IP address corresponding to the assigned VLAN and that grants access to the VLAN. The computing entity may provision the VLAN for the client device to exchange data through the VLAN. In such a manner, the client device may only need to request an IP address once, without having to undergo a CoA procedure that would entail interruptions or disruptions in service or access.

Figure 4B:
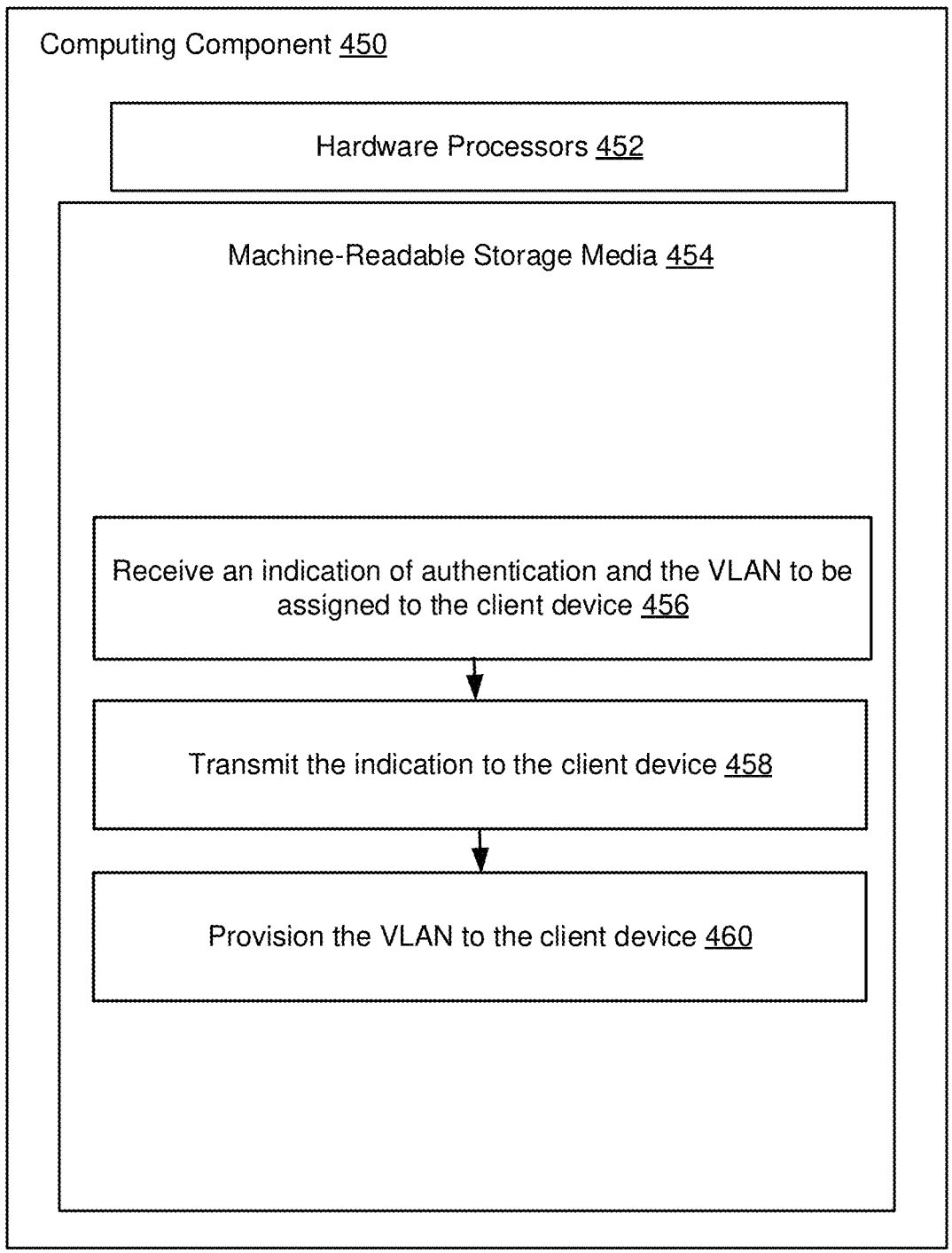
FIG. 4B is an exemplary flowchart, depicting an exemplary illustration of a computing entity that provides access to a network for client devices through the VLANs, according to examples described in the present disclosure.

FIG. 4B illustrates a computing component 450 that includes one or more hardware processors 452 and machine-readable storage media 454 storing a set of machine-readable/machine-executable instructions that, when executed, cause the hardware processor(s) 452 to perform an illustrative method of provisioning a VLAN to a client device. It should be appreciated that there can be additional, fewer, or alternative steps performed in similar or alternative orders, or in parallel, within the scope of the various examples discussed herein unless otherwise stated. The computing component 450 may be implemented as the controller 124 of FIGS. 1, 2, and 3. The machine-readable storage media 604 may include suitable machine-readable storage media described in FIG. 5. FIG. 4B illustrates subsequent steps, implemented by a different computing entity, to the steps in FIG. 4A.

At step 456, the hardware processor(s) 452 may execute machine-readable/machine-executable instructions stored in the machine-readable storage media 454 to receive an indication of authentication of a client device (e.g., the client device 150 of FIG. 1) and the VLAN to be assigned to the client device. In some examples, the hardware processor(s) 452 may also receive an indication of a VSA for the client device. At step 458, the hardware processor(s) 452 may execute machine-readable/machine-executable instructions stored in the machine-readable storage media 454 to transmit the indication of the authentication, the VLAN, and/or the VSA to the client device. The client device may then request, from a DHCP server (e.g., the DHCP server 128) an IP address corresponding to the VLAN. At step 460, the hardware processor(s) 452 may execute machine-readable/machine-executable instructions stored in the machine-readable storage media 454 to provision the VLAN to the client device. The hardware processor(s) 452 may assign a port for the client device to access the VLAN and configure the port. The hardware processor(s) 452 may verify that the client device is successfully accessing the VLAN based on data traffic exchanged by the client device within the VLAN, and/or verify that the client device is in compliance with access level, access privileges, and/or VSA determined by the authentication server 111. If not in compliance, the hardware processor(s) 452 may restrict access for the client device within the VLAN and/or shut down access, depending on a degree of noncompliance.

Figure 5:
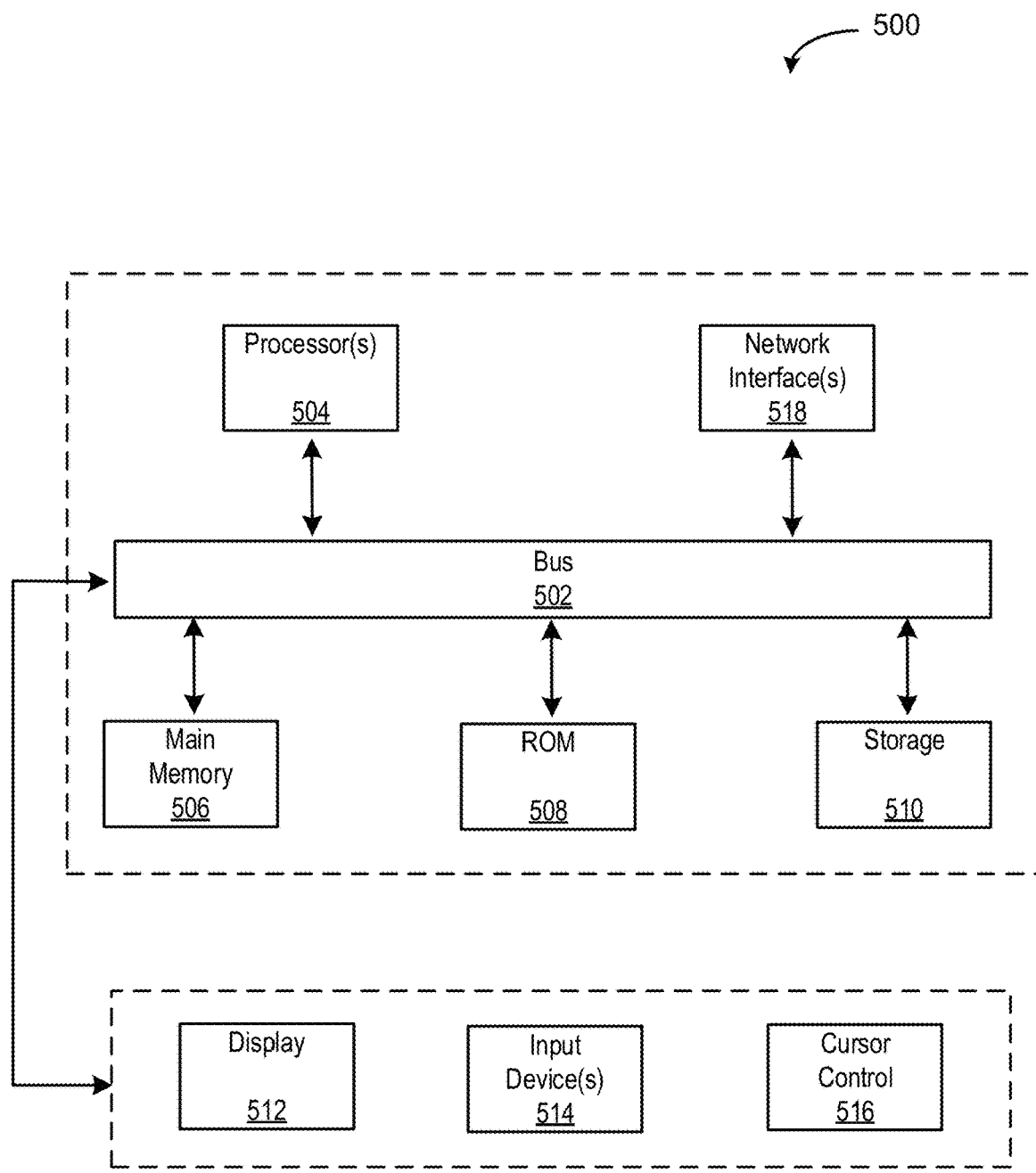
FIG. 5 is an example computing component that may be used to implement various features of examples described in the present disclosure.

FIG. 5 depicts a block diagram of an example computer system 500 in which various of the examples described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some examples, the same direction information and command selections as cursor control may be implemented via receiving touches on a touch screen without a cursor.

The computer system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "component," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one example, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

What is claimed is:

1. A method of a server computer, comprising:
   receiving an authentication packet from a controller indicating an authentication request from a client device requesting connection at a network;
   extracting, from a body of the authentication packet, identification information of the client device;
   verifying credentials of the client device based on the identification information;
   after verifying the credentials, detecting a modification of access control information for the client device;
   determining whether the modification of the access control information would impact a virtual local area network (VLAN) assignment to the client device;
   based on determining that the modification of the access control information would impact the VLAN assignment to the client device, delaying, by the server computer, an assignment of a VLAN to the client device until the modification of the access control information completes;
   after the delay, determining, based on the identification information, a level of access of the client device at the network;
   based on the level of access, assigning the VLAN to the client device; and
   transmitting, from the server computer to the controller, a single authentication response packet comprising an indication of approval of the credentials and the assigned VLAN, wherein the controller provisions the assigned VLAN to the client device.

2. The method of claim 1, further comprising:
   prior to the determination of the level of access, refraining from authorizing the client device access to the network.

3. The method of claim 1, further comprising:
   computing, by the server computer, an estimated duration of the modification of the access control information; and
   determining, by the server computer, to delay the VLAN assignment based on the estimated duration and a security or privacy associated with resources whose access is affected by the modification of the access control information.

4. The method of claim 1, further comprising:
   computing, by the server computer, an estimated duration of the modification of the access control information; and
   determining, by the server computer, to delay the VLAN assignment based on the estimated duration and a predicted frequency of access of resources whose access is affected by the modification of the access control information.

5. The method of claim 1, comprising:
   modifying, by the server computer, the access control information.

6. The method of claim 5, further comprising:
   propagating, by the server computer, the modified access control information to one or more routers of the network.

7. The method of claim 1, further comprising:
   determining, based on the identification information, a communication speed or a bandwidth of traffic communicated with the client device, wherein the single authentication response packet comprises the indication of approval of the credentials, the assigned VLAN, and the communication speed or the bandwidth, wherein the controller is to provision the VLAN based on the communication speed or the bandwidth.

8. The method of claim 1, wherein the identification information comprises a network address of the client device, and the access control information indicates that any client device having a portion of the network address is permitted to access a resource of the network.

9. A computing system comprising:
   a processor; and
   a non-transitory storage medium storing instructions executable on the processor to:
      receive an authentication packet from a controller indicating an authentication request from a client device requesting connection at a network;
      extract, from a body of the authentication packet, identification information of the client device;
      verify credentials of the client device based on the identification information;
      after verifying the credentials, detect a modification of access control information for the client device;
      determine whether the modification of the access control information would impact a virtual local area network (VLAN) assignment to the client device;
      based on determining that the modification of the access control information would impact the VLAN assignment to the client device, delay an assignment of a VLAN to the client device until the modification of the access control information completes;
      after the delay, determine, based on the identification information, a level of access of the client device at the network;
      based on the level of access, assign the VLAN to the client device; and
      transmit, from the computing system to the controller, a single authentication response packet comprising an indication of successful authentication of the client device and the assigned VLAN, wherein the controller is to provision the assigned VLAN to the client device.

10. The computing system of claim 9, wherein the instructions are executable on the processor to:
    prior to the determination of the level of access, refrain from authorizing the client device access to the network.

11. The computing system of claim 9, wherein the instructions are executable on the processor to:
    compute an estimated duration of the modification of the access control information; and determine to delay the VLAN assignment based on the estimated duration and a security or privacy associated with resources whose access is affected by the modification of the access control information.

12. The computing system of claim 9, wherein the instructions are executable on the processor to:
compute an estimated duration of the modification of the access control information; and
determine to delay the VLAN assignment based on the estimated duration and a predicted frequency of access of resources whose access is affected by the modification of the access control information.

13. The computing system of claim 9, wherein the instructions are executable on the processor to:
determine, based on the identification information, a communication speed or a bandwidth of traffic communicated with the client device, wherein the single authentication response packet comprises the indication of successful authentication of the client device, the assigned VLAN, and the communication speed or the bandwidth, wherein the controller is to provision the VLAN based on the communication speed or the bandwidth.

14. The computing system of claim 9, wherein the instructions are executable on the processor to:
modify the access control information at the computing system.

15. The computing system of claim 14, wherein the instructions are executable on the processor to:
propagate, from the computing system, the modified access control information to one or more routers of the network.

16. The computing system of claim 9, wherein the identification information comprises a Media Access Control (MAC) address of the client device, and the access control information indicates that any client device having a portion of the MAC address is permitted to access a resource of the network.

17. A non-transitory computer readable medium comprising instructions that upon execution cause a server computer to:
receive an authentication packet from a controller indicating an authentication request from a client device requesting connection at a network;
extract, from a body of the authentication packet, identification information of the client device;
verify credentials of the client device based on the identification information;
after verifying the credentials, detect a modification of access control information for the client device;
determine whether the modification of the access control information would impact a virtual local area network (VLAN) assignment to the client device;
based on determining that the modification of the access control information would impact the VLAN assignment to the client device, delay an assignment of a VLAN to the client device until the modification of the access control information completes;
after the delay, determine, based on the identification information, a level of access of the client device at the network;
based on the level of access, assign the VLAN to the client device; and
transmit, from the server computer to the controller, a single authentication response packet comprising an indication of approval of the credentials and the assigned VLAN, wherein the controller is to provision the assigned VLAN to the client device.

18. The non-transitory computer readable medium of claim 17, wherein the instructions upon execution cause the server computer to:
compute an estimated duration of the modification of the access control information; and
determine to delay the VLAN assignment based on the estimated duration and a security or privacy associated with resources whose access is affected by the modification of the access control information.

19. The non-transitory computer readable medium of claim 17, wherein the instructions upon execution cause the server computer to:
compute an estimated duration of the modification of the access control information; and
determine to delay the VLAN assignment based on the estimated duration and a predicted frequency of access of resources whose access is affected by the modification of the access control information.

20. The non-transitory computer readable medium of claim 17, wherein the instructions upon execution cause the server computer to:
modify the access control information at the server computer; and
propagate, from the server computer, the modified access control information to one or more routers of the network.

* * * * *